United States Patent [19]

Zimmerman

[11] 3,870,171
[45] Mar. 11, 1975

[54] LIFTING MECHANISM FOR FRONT END LOADER

[76] Inventor: Emil F. Zimmerman, Richardton, N. Dak. 58652

[22] Filed: May 18, 1973

[21] Appl. No.: 361,518

[52] U.S. Cl.............. 214/131 R, 214/139, 214/140
[51] Int. Cl.............................................. B66f 9/00
[58] Field of Search......... 214/131 A, DIG. 10, 130, 214/131 R, 139, 140, 512; 298/22 J, 22 D, 19 B; 212/8 R, 8 B, 9

[56] References Cited
UNITED STATES PATENTS

| | | | |
|---|---|---|---|
| 2,393,299 | 1/1946 | Denning | 214/139 |
| 2,621,814 | 12/1952 | Lisota | 298/22 D |
| 3,272,558 | 9/1966 | Rathman | 298/22 D |
| 3,324,954 | 6/1967 | Westendorf | 214/131 A |
| 3,341,042 | 9/1967 | Carder | 214/512 |

Primary Examiner—Robert J. Spar
Assistant Examiner—Lawrence J. Oresky
Attorney, Agent, or Firm—H. Dale Palmatier; James R. Haller

[57] ABSTRACT

Apparatus is disclosed for attachment to a tractor and for providing a hydraulically actuated lifting boom having a pivotal connection to the rear axle of the tractor and having a scissors linkage for lifting the boom.

13 Claims, 6 Drawing Figures

LIFTING MECHANISM FOR FRONT END LOADER

This invention relates to a lifting apparatus for attachment to machines such as tractors. It includes a novel power-actuated boom which is affixed to a tractor, and to which can be connected a wide variety of machine tools, such as hay loaders, plows, buckets, etc. When the invention is not being used it retracts into a rest position which allows complete and free use of the tractor without interference.

Prior art attempts at developing an attachable lifting mechanism for use on tractors have usually resulted in hydraulically-operated mechanisms having a number of disadvantages. Among these is the disadvantage that they frequently interfered with the normal uses of the tractor. In some cases the hydraulic mechanism projected into the operator's line of vision, restricting his operation of the tractor. In other cases portions of the hydraulic apparatus had to be dismantled in order for the tractor to be used for other purposes. A further disadvantage frequently occurring with prior art devices was the uneven loading which such devices placed upon the tractor. They required substantial counterweights to be placed at the rear of the tractor because the lifting apparatus frequently failed to distribute the load evenly over the tractor frame, and tended to tip the tractor forward.

The present invention overcomes these and other disadvantages by providing a lifting apparatus which is completely retractable and may be left attached to the tractor at all times, without interfering with the normal tractor use. Further, the connection of tools to the lifting apparatus can be accomplished quickly and conveniently, and in its retracted position the invention allows complete freedom of vision for the tractor operation. The invention distributes the load to be lifted evenly over the tractor frame, with the load lifting force being approximately located at the tractor's center of gravity. Thus, the tendency for a tractor to tip forward upon lifting is minimized, and rear-loaded counterweights on the tractor are unnecessary.

The novel features of the present invention include a unique lifting boom attachable at a rearward point of the tractor frame, such as the rear axle, and a scissors linkage arrangement, preferably driven by a hydraulically-actuated cylinder, which raises the boom. The scissors linkage allows a few inches of hydraulic piston movement to be transferred into several feet of boom movement.

The inventive boom is preferably pivotally-connected at one of its ends to a bracket connected to the rear axle of the tractor. An intermediate point of the boom is attachable to the tractor frame via the scissors linkage arrangement. The hydraulic jack or cylinder is also connected to the scissors linkage and to the tractor frame. When hydraulic pressure is introduced into the hydraulic system it causes the scissors linkage to open, therby lifting the boom mechanism about its rear axle pivot; the resultant motion at the front of the tractor where the other boom end extends is a high lifting arc. Any tool attached to the front end of the boom is therefore raised from the ground to a point above the tractor.

Another feature of this invention is a second hydraulically-actuated rod or jack, and associated linkage, for controlling the pivotal motion of an object being lifted. For example, this second hydraulic mechanism may be used to tilt a bucket after it has been lifted; this mechanism operates independently of the boom lifting mechanism.

Another feature of the invention includes a third hydraulically-actuated rod or jack for initially lifting the boom from its rest position. This third mechanism serves to lift the boom only several inches, for initially unlocking the scissors linkage from its retracted position.

Other features and advantages of this invention will become apparent from the following detailed description, claims, and the accompanying drawings, in which:

Figure 1:
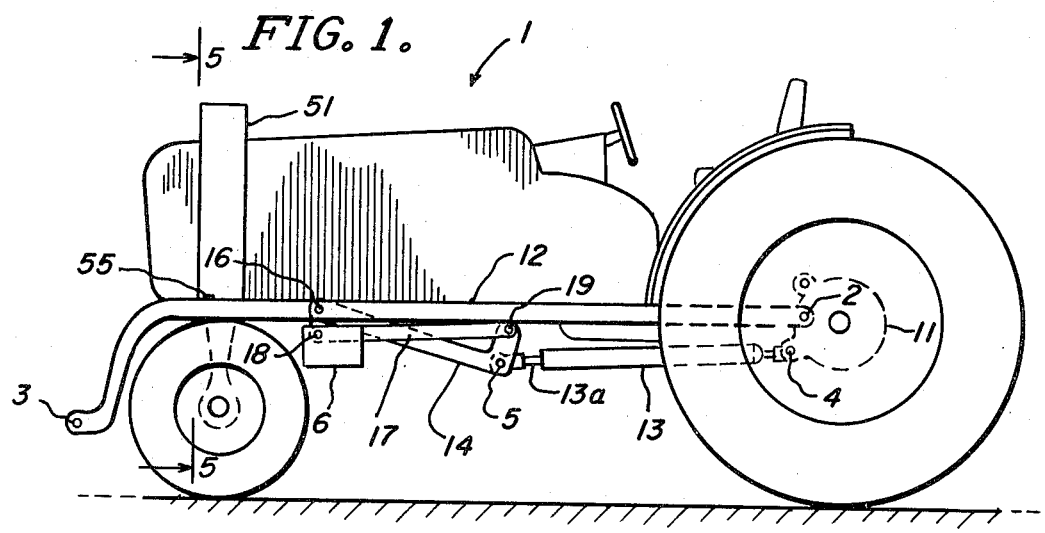
FIG. 1 is a side elevational view of the invention connected or attached to a tractor.
Figure 4B:
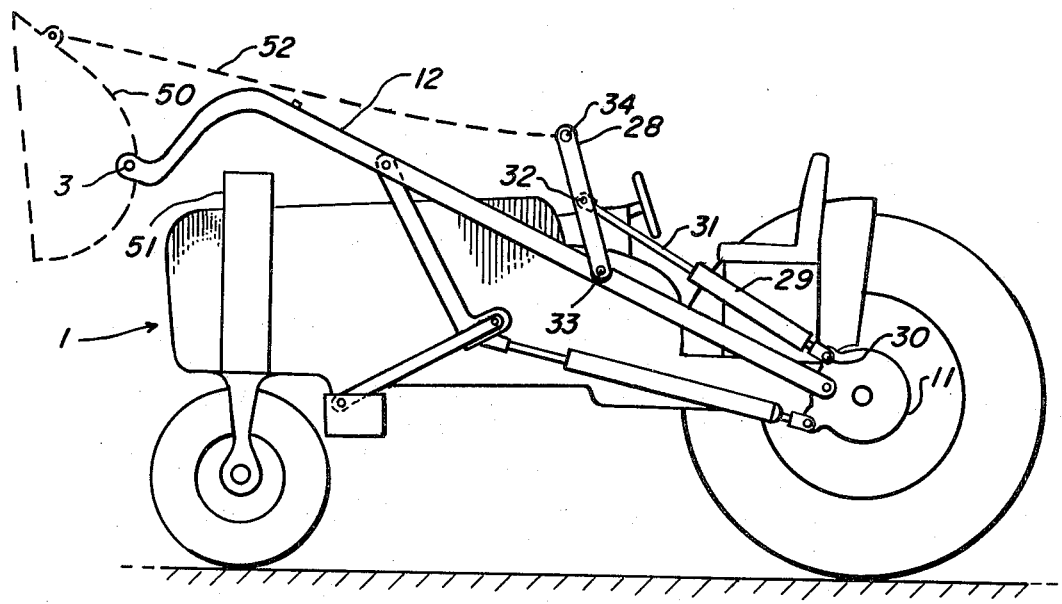
Figure 4A:
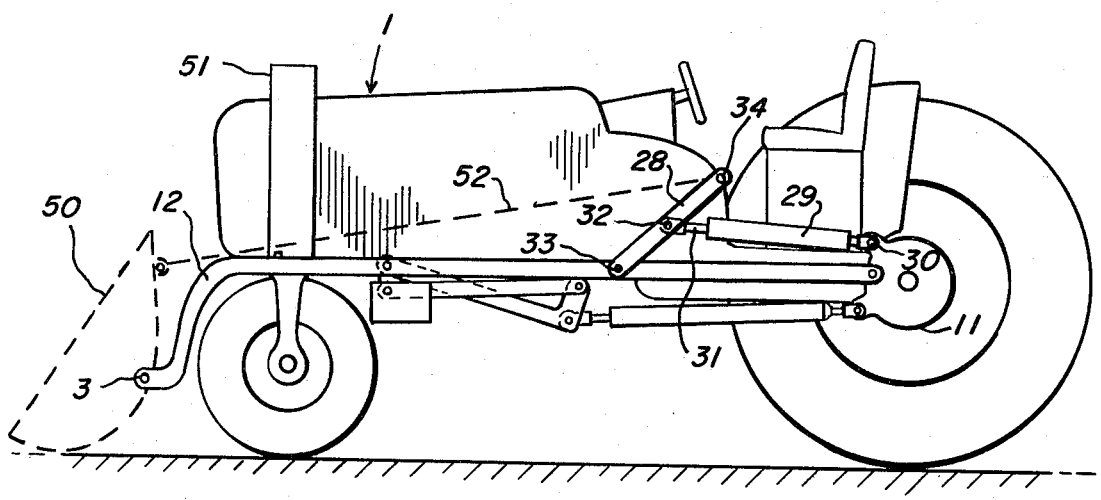
Figure 5:
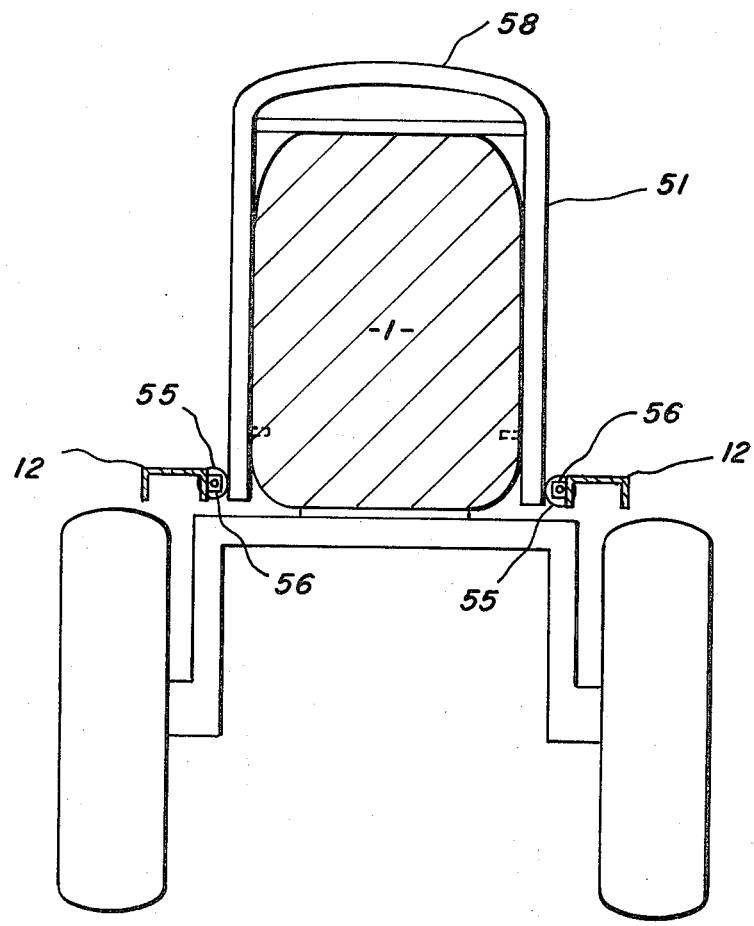

FIGS. 4 a and 4 b are a side elevational view showing the additional hydraulic control mechanism of this invention in two positions; and FIG. 5 is a partial cross sectional view taken along the lines 5—5 of FIG. 1.

Referring to FIG. 1, there is shown a tractor having an embodiment of the invention attached to its frame. The boom and hydraulic mechanism are shown for only one side of the tractor; it is understood that indentical apparatus is attached to the other side of the tractor. A rear axle housing 11 is rigidly attached to the tractor axle at a point interior each rear wheel; boom 12 is typically attached to rear axle housing 11 by means of pin 2. The front end of boom 12 is shaped and adapted for connecting to a plow, bucket or other equipment; mounting hole 3 is shown as a representative connecting means. A jack or hydraulic cylinder 13 is also pivotally connected to rear axle housing 11, by means of pin 4. Hydraulic cylinder 13 has an extendible rod 13a connected to a first link 14 by means of pin 5. This connection is made at one corner of link 14 and allows for pivotal freedom of rod 13a and pin 5. Another corner of link 14 is connected to boom 12 by means of pivot pin 16. A second link, scissors link 17 is pivotally connected to a frame bracket 6 at pivot pin 18. The other end of scissors link 17 is connected to a third corner of link 14 at pivot pin 19. The entire apparatus as shown in FIG. 1 is in a retracted position and, because it is folded down very compactly it may be permanently attached to the tractor without interfering with other tractor operations.

FIG. 1 also illustrates a vertical frame 51 attached to the tractor at a point near the front of the tractor. Frame 51 prevents lateral movement of boom 12 over a large segment of boom 12's initial lifting arc. Boom 12 is slideably engaged against vertical frame 51 in a manner which will be more fully explained with reference to FIG. 5.

Figure 2:
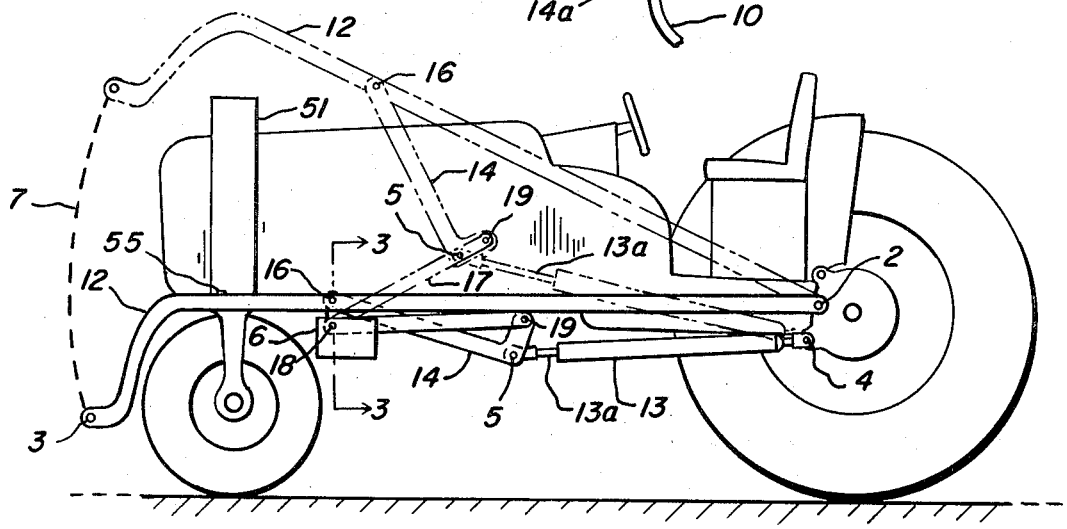
FIG. 2 is a side elevational view showing the invention in two positions.

FIG. 2 illustrates the apparatus of FIG. 1 in two positions. For convenience of illustration, the apparatus is shown with non-essential tractor features removed; for example, the exterior tractor wheel is not shown in FIG. 2 Dotted line 7 shows the path of travel of the end of boom 12. This path of travel extends over several feet in length, and occurs as a consequence of applying hydraulic pressure to cylinder 13, thereby causing extendible rod 13a to move outwardly from cylinder 13. The extension of rod 13a is illustrated by a comparison of its length in the lower position with its length in the upper position. As hydraulic pressure forces rod 13a outward, it bears against pin 5 on link 14, forcing the link to move upwardly.

An auxiliary starting jack or cylinder 20 may be used to urge boom 12 initially away from its retracted position. Hydraulic jack 20 is mounted against frame bracket 6 and exerts an upward force against boom 12. Typically, hydraulic jack 20 is connected in parallel with hydraulic cylinder 13 so that jack 20 will operate before rod 13a begins to move, merely because of the mechanical resistance being greater against rod 13a. After jack 20 lifts boom 12 upwardly a very slight distance, the pressure on rod 13a decreases greatly and hydraulic cylinder 13 will then elevate boom 12 as illustrated in FIG. 2.

As rod 13a extends from its retracted or lower position it forces link 14 forwardly and upwardly. Since link 14 is also connected by means of scissors link 17 at pivot pin 19, its motion is constrained to follow an arcuate path. The arcuate path, combined with the forward driving force of rod 13a, causes the corner of link 14 and pivot pin 16 to raise upwardly. Since boom 12 is connected to pivot pin 16, it also moves upwardly.

Figure 3:
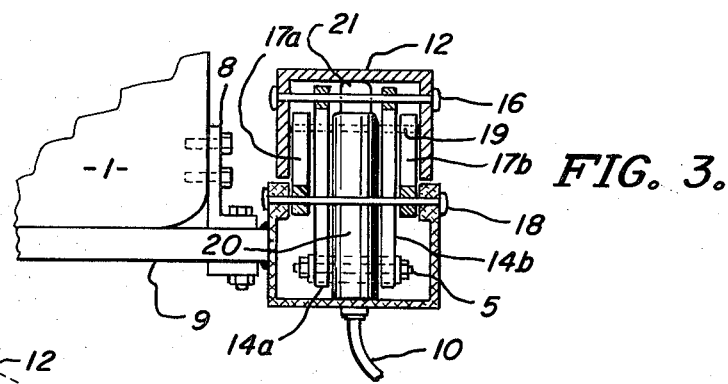
FIG. 3 is a partial cross sectional view taken along the lines 3—3 of FIG. 2.

FIG. 3 is a partial cross sectional view taken along the lines 3—3 of FIG. 2. FIG. 3 illustrates in more detail the linkages and apparatus within the frame bracket 6. Frame bracket 6 is rigidly attached to tractor 1 by means of an L-bracket 8 and mounting bar 9, or other convenient mounting means. One frame bracket 6 is associated with each boom 12, there being one mounted on either side of tractor 1. Hydraulic jack 20 is attached to frame bracket 6, and has its extendible rod 21 bearing against the upper interior surface of boom 12. Hydraulic jack 20 is actuated by means of hydraulic fluid through hose 10. The introduction of such fluid under pressure is controlled by the tractor operator.

FIG. 3 also illustrates the interconnections and positions of various linkages shown in FIG. 2. For example, link 14 of FIG. 2 is comprised of link halves 14a and 14b, both of which are pivotal about pin 16. The corner of link 14 connectable rod 13a is so connected by means of bolt 5 passing through link halves 14a and 14b, with rod 13a connected therebetween. Link 17 of FIG. 2, shown connected between pivot pin 18 and pivot pin 19, is comprised of halves 17a and 17b as shown in FIG. 3.

FIG. 4A illustrates the invention in its retracted position and having an additional hydraulic cylinder 29 pivotally attached to rear axle housing 11 by means of pin 30. Hydraulic cylinder 29 has an extendible rod 31 operable upon application of hydraulic pressure. Extendible rod 31 is connected at its end to pivot pin 32, which passes through link 28. One end of link 28 is adapted at pin 34 for connection to a machine tool as will hereafter be described; the other end of link 28 is pivotally connected to boom 12 at pivot pin 33.

Meterial handling and lifting devices having a bucket or other apparatus mounted on a boom such as described herein ordinarily have a second hydraulic control mechanism for pivoting the bucket relative to the lifting boom. Hydraulic cylinder 29, operating in conjunction with link 28, provides this second control function in the present apparatus. FIG. 4B illustrates boom 12 in its elevated position, and also illustrates hydraulic cylinder 29 fully actuated with rod 31 fully extended. It is apparent that pivot point 34 is movable relative to the forward end of boom 12. If, for example, the invention is adapted for use with a bucket 50, as illustrated in dotted outline form in FIG. 4A and 4B the lifting of bucket 50 is accomplished by means of the apparatus herein described. Once bucket 50 is lifted to an elevated position it can be tilted to unload its contents by means of hydraulic cylinder 29 and its associated linkage. This tilting is illustrated in FIG. 4B by means of dotted line connection 52 between bucket 50 and and pivot point 34. Hydraulic cylinder 29 is independently controllable by the operator so that the movement of link 28 can be adjusted at any elevational distance of boom 12 from the ground. This additional feature of the invention, when operated in conjunction with the other described features, gives the invention great flexibility and application for many lifting and dumping chores.

FIG. 5 is a partial cross sectional view taken along the lines 5—5 of FIG. 1, and illustrates the cooperation between vertical frame 51 and boom 12. Frame 51 is rigidly attached to tractor 1 by bolts or other attaching means. Booms 12, on either side of the body of tractor 1, slideably engage frame 51, preferably by means of a roller wheel 55 attached to each boom 12. Attachment of roller wheels 55 to booms 12 is accomplished by a mounting bracket 56, associated with each wheel. Vertical frame 51 serves as a lateral motion stabilizer for booms 12. As the booms are raised, roller wheels 55 are guided along the outer surface of vertical frame 51. This causes the booms to raise without lateral motion, thereby eliminating torsional forces about pivot pin 2 on the tractor rear axle.

The top of vertical frame 51 consists of a curved member 58 which serves to guide roller wheels 55 back to the outer surfaces of frame 51 when the booms 12 are lowered.

Many adaptations of the features herein described may be made within the scope of the invention. For example, vertical frame 51 may be angled or arced rearward to coincide with the path of travel of the roller wheels 55 attached to the booms. The selection of rear axle housing 11 as the pivotal mounting location for the apparatus of this invention is not critical. Any other rigid mounting point near the rear of the tractor frame may be equally adapted for this purpose. For example, a bracket may be attached to the tractor frame itself at a point near to the rear axle. Also, the inventive features may be utilized with a frame bracket 6 mounted in a position other than as snown in the drawings; it is only necessary that frame bracket 6 be located near the front of the tractor, ahead of the center of gravity.

I claim:

1. An apparatus for connecting to lifting tools and attachable to a tractor frame, comprising:
   a pair of elongated booms each pivotally mounted on a side of the tractor at a point near the tractor rear axle, and extending forwardly to the tractor front end for connection to a lifting tool and movable between a substantially horizontal rest position and an elevated position, the apparatus having on each side of the tractor:
   a. a first link pivotally mounted at one end to the boom, and a second link pivotally mounted at one end to the tractor frame forward of the tractor's center of gravity and at its other end to the other end of the first link, the links being crossed when the booms are in the rest position b. a hydraulic jack pivotally mounted to the tractor frame at a point near the tractor rear axle and having an extendible rod pivotally connected to the other end of the first link at a point lower than the pivotal connection between the first and second links when the booms are in the rest position; and c. an upwardly extending guide frame mounted to said tractor in slideable, guiding engagement with said boom.

2. An apparatus as claimed in claim 1, further comprising a pair of second hydraulic jacks, each supported by said tractor frame and having an extendible rod upwardly movable against said boom.

3. Apparatus as claimed in claim 2, further comprising a pair of brackets, each rigidly attached to said tractor frame at a point forward of the tractor center of gravity and supporting said pivotal mounting of said second link to the tractor frame.

4. Apparatus as claimed in claim 3, further comprising a pair of rear axle housings, each rigidly attached to said tractor rear axle at a distance interior said tractor wheel, said housings having pivotal mounting connections for attaching said pivotal boom end and said first hydraulic jack.

5. Apparatus as claimed in claim 4 wherein said first and second links extend rearwardly from their respective pivotal mountings to the boom and frame to approximately the center of gravity of said tractor.

6. Apparatus as claimed in claim 5, further comprising a pair of third hydraulic jacks pivotally mounted on said rear axle housing, and having an extendible rod forwardly actuable along said boom.

7. Apparatus as claimed in claim 6, further comprising a linking element pivotally attached to said boom and having a pivotal connection along its length for attachment to said third hydraulic jack extendible rod.

8. Lifting apparatus for attachement to a tractor frame and rear axle, comprising:

a pair of rear axle housings, each having means for rigidly attaching to the tractor rear axle at a point interior to a rear wheel, and having at least two pivotal mounting connections;

a pair of booms, each mounted at one of its ends to said housing pivotal mounting connections and extending therefrom to a position forward the tractor frame, and having a forward end adaptable for connection to a tool;

a pair of first frame brackets, each rigidly attached to the tractor frame in alignment with a boom at a point forward the center of gravity of said tractor, and having a pivotal mounting connection;

a pair of upwardly extending boom guide frames rigidly attached to respective sides of said tractor and slidably engaging the respective booms to stabilize lateral motion of the latter a pair of L-shaped first links each pivotally connected at one end to a respective boom at a point substantially adjacent said first frame bracket pivotal mounting connection and having a rearwardly extending link end a pair of second links each pivotally connected at one end to a respective first frame bracket pivot mounting point and extending rearwardly in crossing relation to the first link for pivotal connection to the rearwardly extending link end of the first link; and pair of hydraulically actuated cylinders, each of said cylinders pivotally mounted to said rear axle housing pivotal mounting connections, and having an extendible rod pivotally connected to the vertex of one of the L-links at a distance below the pivotal connection between the first and second links.

9. Apparatus as claimed in claim 8, further comprising a second pair of hydraulic jacks, each mounted on said first frame bracket and having an extendible rod upwardly moveable against said boom.

10. Apparatus as claimed in claim 9, further comprising a third pair of hydraulic jacks, each jack pivotally connected at one of its ends to said rear axle housing and having an extendible rod with a pivotal mounting connection; and a further link pivotally connected to said boom and to said extendible rod pivotal mounting connection.

11. The apparatus of claim 1 including an inverted U-shaped guide frame mounted to the tractor and including upwardly extending, rigid guides, and rollers attached to inner surfaces of the respective booms and oriented to contact and roll along outer surfaces of the respective guides to stabilize lateral motion of the booms as the latter are raised and lowered.

12. A lifting apparatus for attachment to a tractor and comprising:

a. a pair of elongated booms pivotally mounted on respective sides of the tractor at points near the tractor rear axle and extending forwardly to the tractor front end and movable between a substantially horizontal rest position and an elevated position, and including a bucket or the like pivotally attached to front ends of the booms forwardly of the tractor front end;

b. a pair of first links each pivotally mounted at one end to a respective boom, and a pair of second links each pivotally mounted at one end to the tractor frame forward of the tractor center of gravity and at the other end to the other end of the first link, the links being crossed when the booms are in the rest position;

c. a first pair of hydraulic jacks each pivotally mounted to the tractor frame at a point near the tractor rear axle and having an extendible rod pivotally connected to the other end of a respective first link at a point lower than the pivotal connection between the first and second links when the booms are in the rest position; and d. a second pair of hydraulic jacks each connected to the tractor at one end near the rear axle and having a generally forwardly extendible rod, and a pair of third links each connected pivotally at one end to a respective boom and each connected pivotally along its length to an extendible rod of the third pair of hydraulic jacks, and a connector connecting the third link at a point along its length to the bucket or the like whereby acuation of the last-mentioned hydraulic jacks tilts the bucket or the like with respect to the booms.

13. Lifting apparatus for attachment to a tractor frame and rear axle housings on either side of the tractor, the apparatus comprising:

a pair of booms each pivotally mounted at one end to a respective axle housing and extending therefrom to a position forward of the tractor frame, and having a forward end connectable to a tool;

a pair of first frame brackets, each rigidly attached to the tractor frame in alignment with a respective boom at a point forward of the center of gravity of said tractor, and having a pivotal mounting connection;

a pair of upwardly extending boom guide frames rigidly attached to respective sides of said tractor and slidably engaging the respective booms to stabilize lateral motion of the latter;

a pair of L-shaped first links each pivotally connected at one end to a respective boom at a point substantially adjacent said first frame bracket pivotal mounting connection and having a rearwardly extending link end;

a pair of second links each pivotally connected at one end to a respective first frame bracket pivot mounting point and extending rearwardly in crossing relation to the first link for pivotal connection to the rearwardly extending link end of the first link;

a pair of hydraulically actuated cylinders each pivotally mounted to a respective rear axle housing pivotal mounting connection and having an extendible rod pivotally connected to the vertex of a respective L-link at a distance below the pivotal connection between the first and second links;

a pair of second hydraulic jacks each mounted on a respective first frame bracket and each having an extendible rod upwardly movable against a respective boom;

a pair of third hydraulic jacks each pivotally connected at one end to a respective rear axle housing and each having a generally forwardly extendible rod with a pivotal mounting connection; and a pair of third links each pivotally connected at one end to a respective boom and each pivotally connected along its length to a respective extendible rod of the third pair of hydraulic jacks.

* * * * *